United States Patent [19]
Field

[11] 3,750,611
[45] Aug. 7, 1973

[54] TWO-WAY CAM CLEAT
[75] Inventor: Gregory A. Field, Annapolis, Md.
[73] Assignee: S and R Associates, Inc., Annapolis, Md.
[22] Filed: Sept. 24, 1971
[21] Appl. No.: 183,312

[52] U.S. Cl. ............................................. 114/218
[51] Int. Cl. ............................................. B63b 21/08
[58] Field of Search ...................... 114/218, 199; 24/134 R, 134 CP, 134 N, 134 P, 134 Q, 134 QA

[56]  References Cited
UNITED STATES PATENTS
111,843    2/1871   Hendey ........................... 24/134 P
369,318    9/1887   Craine ............................ 24/134 CP
3,265,032  8/1966   Hume ............................. 114/218
102,548    5/1870   Hurtt ............................. 24/134 CP Primary Examiner—Milton Buchler
Assistant Examiner—Gregory W. O'Connor
Attorney—Richard C. Sughrue, Donald E. Zinn et al.

[57] ABSTRACT

A pair of threadably engaged pivotable cam cleats having oppositely directed camming surfaces are pivotably mounted on a base, spring biased to closed nip position, but permitted to rotate in either direction against the bias of a spring to facilitate the entry of a line between the cam element in either of two opposing directions while preventing retrograde movement by the presence of the line within the nip.

3 Claims, 2 Drawing Figures

PATENTED AUG 7 1973 3,750,611

INVENTOR
GREGORY A. FIELD

BY Sughrue, Rothwell, Mion,
Zinn & Macpeak
ATTORNEYS

TWO-WAY CAM CLEAT

BACKGROUND OF THE INVENTION

1. FIELD OF THE INVENTION

The present invention relates to cam cleats particularly useful in holding a line of the running rigging of a sailboat by use of a pair of spring biased pivotable cam elements.

2. DESCRIPTION OF THE PRIOR ART

Conventionally, a cam cleat comprises a pair of spring biased cam elements or a single spring biased cam element and an abutment which pivot about an axis and are spring biased into closed nip position to define a line-receiving nip between the elements or between the element and a fixed abutment. The coaction and the spring bias of the elements to closed nip position are such that a line, for instance, a sheet, halyard or other component of the running rigging of a sailboat, forced into the nip of the cam cleat against the bias of the spring means, may be moved axially in one direction of the line against the bias but is securely held against retrogressive movement in the opposite axial direction, since in the opposite direction, the nip area or the gap between the cam elements or between the cam element and the abutment reduces in size. A strong frictional grip is achieved since the line is actually squeezed between the cam elements or between the cam element and the abutment under any attempt in retrograde movement.

SUMMARY OF THE INVENTION

The present invention is directed to a cam cleat which will receive a line from either of two opposing directions and securely hold that line against retrogressive movement in the opposite axial direction from the direction of insertion of the same between spring biased cam elements. The present invention is contrasted to the prior art devices where the cam cleats are limited to receiving a line from one direction only. In the illustrated embodiment, the present invention consists of a base and a pair of spring biased oppositely facing cam elements, each pivotably mounted to the base for rotation about a pivot axis normal to the base. The side wall profiles of the cam elements define a varying size line receiving nip regardless of the direction of insertion of the line. The cam elements are both relatively displaceable about their pivot axis in either direction to vary the size of the nip formed therebetween to accommodate lines of different diameters. Springs carried by the cam elements bias both cam elements into a closed nip position with the side wall of each cam element being characterized by a profile defined by oppositely directed duplicate camming surfaces of decreasing radius away from the closed nip position to vary the size of the nip for accommodating lines of different diameter, being fed from either of two directions. To maintain synchronism of movement during pivoting in either direction against the bias, mating gear teeth are carried on facing arcuate sectors, which in turn constitute radial projections for the respective cam elements. An arcuate recess within each cam element and a fixed pin projecting upwardly from the base and received within the recess limits oscillation of the cam elements in either direction from closed nip position about the pivot axis for the same. Each biasing spring consists of a coil spring concentrically positioned about a mounting screw positioning the cam element on the base and defining the pivot axis for the same, with one end of the coil spring fixed to the base and the other end received within the arcuate recess to define the extent of oscillation of the cam element. The ends of the springs for respective cam elements face in opposite feed directions for the line entering the nip area between the cam elements.

Thus, accordingly, it is a primary object of the present invention to provide a cam cleat which accepts a line from either of two opposing directions and holds that line securely against any retrograde movement in the opposite direction from that from which the line entered the cam cleat.

Other objects, advantages and novel features of the invention will become apparent from the following detailed description of the invention, when considered in conjunction with the accompanying drawings.

DESCRIPTION OF THE PREFERRED EMBODIMENT

Figure 1:
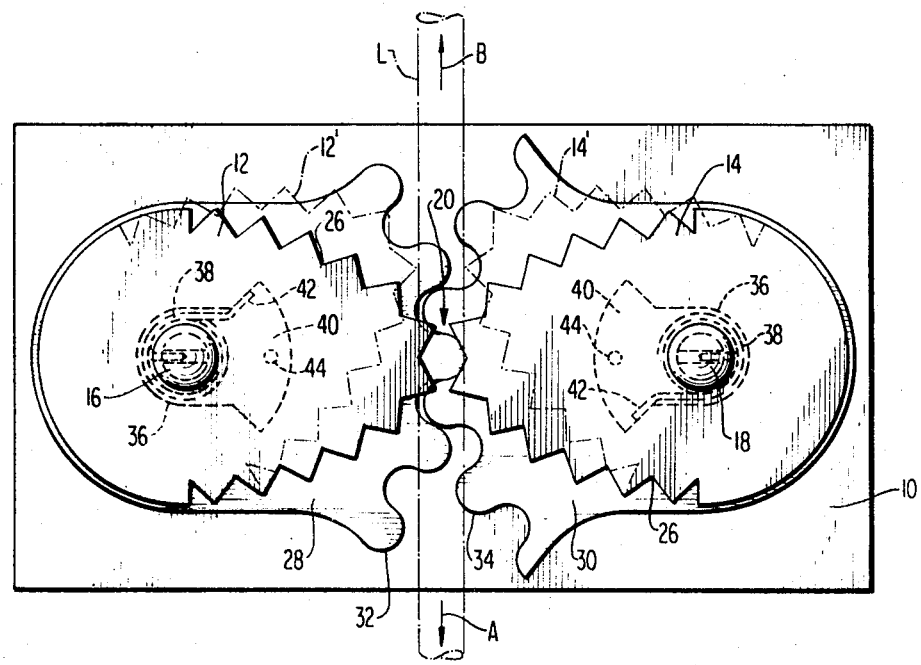
FIG. 1 is a top plan of a dual cam element, two-way cleat with portions illustrated in dotted line fashion.
Figure 2:
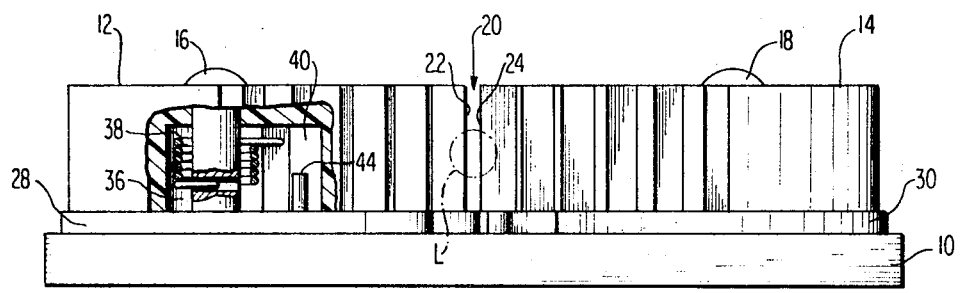
FIG. 2 is a front elevational view of the dual cam element, two-way cam cleat of FIG. 1, partially in section, to illustrate the biasing springs for each cam element.

Referring to the drawings, the arrangement illustrated in FIGS. 1 and 2 constitutes one embodiment of the present invention which consists of a base 10 formed of wood, metal, plastic or composition material, and is provided with oppositely facing cam elements 12 and 14 mounted upon the base 10 by pins 16 and 18, respectively, allowing the cam elements to pivot about the axis of mounting pins 16 and 18, that is normal to the base.

The cam elements cooperate to form a line receiving nip 20, which by relative displacement of the cam element, that is, rotation about the axis of mounting pin 16 and 18 may be enlarged to accommodate lines of different diameters. Essentially, the nip is formed by the opposed line-engaging faces 22 and 24 constituting, in illustrated embodiment, the vertical sidewalls of cam elements 12 and 14 respectively; the line engaging faces 22 and 24 being in confronting relation. The faces 22 and 24 should be substantially parallel to prevent accidental dislodgment of the line and should have vertical serrations 26 or other friction means, to increase resistance to slippage of a line grasped by the camming elements within nip 20.

Of importance to the present invention, is the fact that each cam element 12 and 14 has, as an integral part thereof, arcuate segments 28 and 30 respectively, on whose periphery is provided gear teeth 32 and 34 respectively, the gear teeth being intermeshed to cause the cam elements to pivot in synchronism as a line is forced into the nip 20 in either direction, as indicated by arrows A and B.

Each cam element is provided with a hollow interior circular recess 36 which allows biasing springs 38 to be carried in a concentric manner about both mounting pins 16 and 18, with one end fixed either to the pin 16 or 18 or to base 10, while the opposite free end is caught within enlarged radial recess portion 40 on the side of the cam element facing nip 20. The coil springs 38 for respective cam elements 12 and 14 have their free ends 42 directed toward opposite line feed directions. Thus, the left hand spring, FIg. 1, tends to bias the left hand cam element 12 in a counterclockwise direction, while the right hand spring 38 also tends to bias the right hand camming element 14 counterclockwise. Small diameter pin 44 extends upwardly from the base 10 within each radially enlarged arcuate recess portion 40 to limit rotation of the cam elements 12 and 14 approximately 60 degrees in either direction from the netural nip position shown in FIG. 1 defined by biasing springs 38. The small radius of curvature portion of the serrated line engaging faces 22 and 24 are opposite each other to define the closed nip between opposed faces. It is apparent from viewing FIG. 1 that rotation of the camming element either clockwise or counterclockwise will act to enlarge the nip area or gap between the serrated nip-defining and line-engaging faces 22 and 24.

As illustrated in FIGS. 1 and 2, a line is shown in phantom lines as at L. Movement of line L radially towards the nip 20 in the direction of arrow B, FIG. 1, displaces the cam elements apart progressively until it clears the line-engaging faces 22 and 24 and therefore the nip gap of the cam element is substantially equal to the diameter of the line. At that point, the line moves into line-holding position. This is illustrated in FIG. 1 by dotted lines 12' and 14', indicating that the cam elements 12 and 14 are in positions of ultimate displacement with regard to the particular line L due to forcing of the line into the nip. Movement of line L in the direction of arrow B forces the right hand spring 38 to increased tension, since the end 42 of the spring 38 moves counterclockwise by recess 40 of the camming element being angularly shifted, thus, increasing the bias of the spring but permitting the line to enter the nip 20.

When positioned in the cam cleat as shown in FIG. 1, the line may be moved further in the direction of arrow B, since this has a tendency to increase the nip 20 which grasps the line but any retrograde movement in the direction of arrow A in this case causes the serrated line-engaging faces 22 and 24 to more closely grip the line and retrogressive movement of the line is prevented.

In order to release the line from the dual acting cam cleat, the line must be moved further in the direction of arrow B and pulled upwardly from between the line-engaging faces 22 and 24.

When the line L is pulled in the opposite direction, that is, in the direction of arrow A, assuming that the cam elements are in closed nip position shown in FIGS. 1 and 2, the narrow gap 20 is less than the diameter of the line and will not permit entry of the line L. However, if the cam elements rotate in the opposite directions, winding up the left hand spring 38 occurs, with both cam elements rotating together due to the presence of gear teeth 32 and 34, until a gap or nip area of sufficient size is produced, lying below the plane defined by mounting pin 16 and 18, whereby the line L slips in between the line engaging faces 22 and 24. The cam elements 12 and 14 tend to return to the closed nip position shown in FIG. 1, under the bias of the left hand spring 38 but are prevented by the presence of the line within the nip area. Further, any force pulling on the line opposite to the direction of entry indicated by arrow A, increases the frictional strength between the line and the cam cleat preventing such retrograde or retrogressive movement.

While the illustrated embodiment of the present invention has been described in conjunction with circular recesses 36 and enlarged arcuate recess portions 42 with coil springs concentrically carried on the mounting pins 16 and 18 and having ends received within the arcuate recesses for restoring the cam elements to their minimum nip position, it is obvious that modifications and changes can be made to the precise construction herein disclosed, such as by employing a single spring as a biasing means for one of the cam elements only, since they are geared together for rotationn in opposite directions. Alternatively, the springs may consist of leaf springs and dual springs or a single spring may be used as the biasing means. It is, however, intended that the various changes and modifications may be made within the scope of the invention as defined in the amended claims.

What is claimed is:

1. A cam cleat comprising:
    a base,
    a pair of opposed cam elements pivoted to said base about axes normal to the latter and having confronting faces forming a line-receiving nip therebetween, said cam elements being internally recessed,
    pivot pins fixed to base and extending respectively through said recesses to define the pivot axis for each element,
    a concentric coil spring carried by each pin with one end fixed to said base and the other in contact with abutment means defined by said recess and arranged such that the coil spring biases said cam element in opposite directions and towards closed nip position, said confronting faces being formed by oppositely directed, symmetrical duplicate camming surfaces of increasing radius from the minimum size nip position,
    gear means coupling said cam elements to insure synchronism during pivoting of the same in either of two directions from said minimum nip angular position,
    each internal recess including an enlarged radius, arcuate portion facing the line of entry of said line and a rotation limiting pin extending upwardly from said base within respective enlarged arcuate recess portions to limit the extent of rotation in each direction from minimum size nip position.

2. A two-way cam cleat comprising:
    a base,
    a pair of opposed cam elements pivoted to said base about axes normal to the latter and having confronting faces forming a line-receiving nip therebetween, said cam elements having radially enlarged, symmetrical arcuate segments extending radially therefrom and towards each other to form said confronting faces, the periphery of said cam elements each carrying gear teeth, said gear teeth being intermeshed to insure synchronized rotation of said cam elements about their pivot axes, said cam elements being internally recessed with pivot pins fixed to said base and extending through said recesses to define the pivot axis for each element, and
    concentric coil springs carried by said pins with one end fixed to said base and the other in contact with abutment means defined by said recesses and respectively mounted on said pins so as to bias said cam elements in opposite directions and towards closed nip position such that said cam elements are relatively displaceable in either of two directions from said minimum gap position by a line movable towards said nip and in a direction radially thereof to effect relative displacement between said cam elements in a given direction to the dimension necessary to receive the line within said nip.

3. The two-way cam cleat as claimed in claim 2, wherein each internal recess includes an enlarged radius, arcuate portion facing the line of entry of said line and a rotation limiting pin extends upwardly from said base within respective enlarged arcuate recess portions to limit the extent of rotation in each direction from closed nip position of said geared cam elements.

* * * * *